US012793281B2

(12) United States Patent
Pang et al.

(10) Patent No.: US 12,793,281 B2
(45) Date of Patent: Nov. 10, 2026

(54) LEARNING-BASED POINT CLOUD COMPRESSION VIA UNFOLDING OF 3D POINT CLOUDS

(71) Applicant: InterDigital Patent Holdings, Inc., Wilmington, DE (US)

(72) Inventors: Jiahao Pang, New York, NY (US); Dong Tian, Boxborough, MA (US); Maurice Quach, Palaiseau (FR); Giuseppe Valenzise, Gif-sur-Yvette (FR); Frederic Dufaux, Gif-sur-yvette (FR)

(73) Assignee: InterDigital Patent Holdings, Inc., Wilmington, DE (US)

( * ) Notice: Subject to any disclaimer, the term of this patent is extended or adjusted under 35 U.S.C. 154(b) by 323 days.

(21) Appl. No.: 18/571,361

(22) PCT Filed: Jun. 20, 2022

(86) PCT No.: PCT/US2022/034184

§ 371 (c)(1),
(2) Date: Dec. 18, 2023

(87) PCT Pub. No.: WO2022/271602

PCT Pub. Date: Dec. 29, 2022

(65) Prior Publication Data

US 2024/0282013 A1 Aug. 22, 2024

Related U.S. Application Data

(60) Provisional application No. 63/213,654, filed on Jun. 22, 2021.

(51) Int. Cl.
*G06T 9/00* (2006.01)
*G06T 17/00* (2006.01)

(52) U.S. Cl.
CPC .............. *G06T 9/002* (2013.01); *G06T 17/00* (2013.01); *G06T 2210/56* (2013.01)

(58) Field of Classification Search
None
See application file for complete search history.

(56) References Cited

U.S. PATENT DOCUMENTS 11,122,101 B2 * 9/2021 Fleureau ................ H04N 19/85
11,961,264 B2 * 4/2024 Harviainen ............. G06T 17/00
(Continued)

FOREIGN PATENT DOCUMENTS

WO WO2022232547 11/2022

OTHER PUBLICATIONS

Pang, et al., ("TearingNet: Point Cloud Autoencoder to Learn Topology-Friendly Representations", 2021 IEEE/CVF Conference on Computer Vision and Pattern Recognition (CVPR), Apr. 1, 2021, pp. 7449-7458.) (Year: 2021).*
(Continued)

*Primary Examiner* — Anand P Bhatnagar
(74) *Attorney, Agent, or Firm* — Xiaoan Lu

(57) ABSTRACT

In one implementation, we propose the UnfoldingOperator, which unfolds/flattens an unorganized input 3D point cloud onto a regular 2D grid. Given an input point cloud, an input 2D grid and the reconstructed point cloud produced by the FoldingNet, our proposal maps the input point cloud onto the 2D grid based on the reconstructed point cloud, leading to a 3-channel image. Alternatively, instead of using an image alone to represent a point cloud, the point cloud is decomposed into a codeword and a 3-channel residual image. This residual image is obtained by subtracting the reconstructed point cloud from the original input. The proposed UnfoldingOperator can be applied to point cloud compression, leading to a corresponding compression sys-
(Continued)

tem that we call UnfoldingCompression. The Unfolding-Compression can work with the TearingCompression, where we can adaptively choose whether to use the Unfolding-Compression or TearingCompression.

20 Claims, 14 Drawing Sheets

(56) References Cited

U.S. PATENT DOCUMENTS

| | | | | |
|---|---|---|---|---|
| 12,244,858 | B2 * | 3/2025 | Zakharchenko | G06T 9/001 |
| 12,425,647 | B2 * | 9/2025 | Joshi | H04N 19/119 |
| 2018/0268570 | A1 | 9/2018 | Budagavi et al. | |
| 2019/0087978 | A1 | 3/2019 | Tourapis et al. | |
| 2020/0204782 | A1 * | 6/2020 | Najaf-Zadeh | H04N 19/597 |
| 2022/0353532 | A1 * | 11/2022 | Zakharchenko | H04N 19/132 |
| 2023/0222323 | A1 * | 7/2023 | Pang | G06N 3/0455 706/15 |
| 2023/0308684 | A1 * | 9/2023 | Joshi | H04N 19/597 |
| 2023/0419609 | A1 * | 12/2023 | Wang | G06N 3/0895 |
| 2024/0193819 | A1 * | 6/2024 | Tian | G06T 17/00 |
| 2024/0212220 | A1 * | 6/2024 | Harviainen | G06T 9/001 |
| 2025/0173991 | A1 * | 5/2025 | Shayani | G06N 3/0475 |

OTHER PUBLICATIONS

Pang, et al., "TearingNet: Point Cloud Autoencoder to Learn Topology-Friendly Representations", 2021 IEEE/CVF Conference on Computer Vision and Pattern Recognition (CVPR), Apr. 1, 2021, pp. 7449-7458.

MEPG 3DG, "G-PCC codec description v9," ISO/IEC JTC1/SC29/WG7, N0011, 2020.

Qi et al., "PointNet: Deep learning on point sets for 3D classification and segmentation", in proc. IEEE Conference on Computer Vision and Pattern Recognition, pp. 652-660, 2017.

Li, et al., "Supervised fitting of geometric primitives to 3D point clouds", Proceedings of the IEEE Conference on Computer Vision and Pattern Recognition. 2019.

Yang et al., "FoldingNet: Point Cloud Auto-Encoder via Deep Grid Deformation", arXiv:1712.07262v2, Apr. 3, 2018, pp. 1-14.

Tulsiani et al., "Learning shape abstractions by assembling volumetric primitives", Proceedings of the IEEE Conference on Computer Vision and Pattern Recognition. 2017.

Ballé et al., "Variational image compression with a scale hyperprior", In ICLR (The International Conference on Learning Representations), 23 pages, 2018.

Huang et al, "DeepPrimitive: Image decomposition by layered primitive detection," Computational Visual Media 4.4 (2018): 385-397.

Dovrat et al., "Learning to sample", Proceedings of the IEEE Conference on Computer Vision and Pattern Recognition. 2019.

Meagher, "Geometric modeling using octree encoding", Computer graphics and image processing 19.2 (1982): 129-147.

Zou et al., "3D-PRNN: Generating shape primitives with recurrent neural networks", Proceedings of the IEEE International Conference on Computer Vision. 2017.

Quach et al., "Folding-based compression of point cloud attributes", arxiv.org,Jun. 22, 2020, pp. 1-5.

Eldar et al., "The Farthest point strategy for progressive image sampling", IEEE Trans. on Image Processing, vol. 6, No. 9, pp. 1306-1315, 1997.

Huang et al., "OctSqueeze: Octree-Structured Entropy Model for LiDAR Compression", Proceedings of the IEEE/CVF Conference on Computer Vision and Pattern Recognition. 2020.

Chen et al., "Fast resampling of three-dimensional point clouds via graphs", IEEE Transactions on Signal Processing 66.3 (2017): 666-681.

Quach et al., "Improved deep point cloud geometry compression", 2020 IEEE 22nd International Workshop on Multimedia Signal Processing (MMSP). IEEE, 2020.

Chen et al., "Bsp-net: Generating compact meshes via binary space partitioning", Proceedings of the IEEE/CVF Conference on Computer Vision and Pattern Recognition. 2020.

Li et al., "Primitive fitting using deep boundary aware geometric segmentation", arXiv preprint arXiv:1810.01604 (2018).

Li et al., "Grass: Generative recursive autoencoders for shape structures", ACM Transactions on Graphics (TOG) 36.4 (2017): 1-14.

Quanch et al., Folding-Based Compression of Point Cloud Attributes, arXiv.2002.04439v3 [eess. IV], Jun. 22, 2020, 6 pages.

Yan et al., "Deep AutoEncoder-based Lossy Geometry Compression for Point Clouds", arXiv: 1905.03691[ cs.CV], Apr. 18, 2019, pp. 4321-4328.

Yang et al., FoldingNet: Point Cloud Auto-encoder via Deep Grid Deformation, arXiv.171207262v2, [cs.CV], Apr. 3, 2018, 14 pages.

* cited by examiner

LEARNING-BASED POINT CLOUD COMPRESSION VIA UNFOLDING OF 3D POINT CLOUDS

CROSS REFERENCE TO RELATED APPLICATIONS

This application is a U.S. National Stage Application under 35 U.S.C. 371 of International Patent Application No. PCT/US2022/034184, filed Jun. 20, 2022, which is incorporated herein by reference in its entirety.

This application claims the benefit of U.S. Provisional Patent Application No. 63/213,654 filed Jun. 22, 2021, which is incorporated herein by reference in its entirety.

TECHNICAL FIELD

The present embodiments generally relate to a method and an apparatus for point cloud compression and processing.

BACKGROUND

The Point Cloud (PC) data format is a universal data format across several business domains, e.g., from autonomous driving, robotics, augmented reality/virtual reality (AR/VR), civil engineering, computer graphics, to the animation/movie industry. 3D LiDAR (Light Detection and Ranging) sensors have been deployed in self-driving cars, and affordable LiDAR sensors are released from Velodyne Velabit, Apple iPad Pro 2020 and Intel RealSense LiDAR camera L515. With advances in sensing technologies, 3D point cloud data becomes more practical than ever and is expected to be an ultimate enabler in the applications discussed herein.

SUMMARY

According to an embodiment, a method for decoding point cloud data is provided, comprising: accessing a data array with samples on a regular grid, wherein each sample in said data array indicates a position of a point in a point cloud; and reconstructing said point cloud responsive to said data array. The data array may be decoded by a decoder associated with a neural network-based autoencoder, or an image or video decoder. In addition, a codeword that provides an initial representation of said point cloud may be decoded, wherein said point cloud is reconstructed further responsive to said codeword.

According to another embodiment, a method for encoding point cloud data is provided, comprising: generating a codeword, by a first neural network-based module, which provides a representation of an input point cloud associated with said point cloud data; reconstructing a first point cloud, by a second neural network-based module, based on said codeword and a grid; and generating a data array with samples on said grid, wherein each sample in said data array indicates a position of a point in said input point cloud, based on said reconstructed first point cloud, said grid, and said input point cloud. The data array or codeword may be compressed. The data array can be encoded by an encoder associated with a neural network-based autoencoder, or an image or video encoder.

According to another embodiment, an apparatus for decoding point cloud data is presented, comprising one or more processors, wherein said one or more processors are configured to access a data array with samples on a regular grid, wherein each sample in said data array indicates a position of a point in a point cloud; and reconstruct said point cloud responsive to said data array. The data array may be decoded by a decoder associated with a neural network-based autoencoder, or an image or video decoder. In addition, a codeword that provides an initial representation of said point cloud may be decoded, wherein said point cloud is reconstructed further responsive to said codeword. The apparatus may further include at least one memory coupled to said said more or more processors.

According to another embodiment, an apparatus for encoding point cloud data is presented, comprising one or more processors, wherein said one or more processors are configured to generate a codeword, by a first neural network-based module, which provides a representation of an input point cloud associated with said point cloud data; reconstruct a first point cloud, by a second neural network-based module, based on said codeword and a grid; and generate a data array with samples on said grid, wherein each sample in said data array indicates a position of a point in said input point cloud, based on said reconstructed first point cloud, said grid, and said input point cloud. The data array or codeword may be compressed. The data array can be encoded by an encoder associated with a neural network-based autoencoder, or an image or video encoder.

One or more embodiments also provide a computer program comprising instructions which when executed by one or more processors cause the one or more processors to perform the encoding method or decoding method according to any of the embodiments described above. One or more of the present embodiments also provide a computer readable storage medium having stored thereon instructions for encoding or decoding point cloud data according to the methods described above.

One or more embodiments also provide a computer readable storage medium having stored thereon a bitstream generated according to the methods described above. One or more embodiments also provide a method and apparatus for transmitting or receiving the bitstream generated according to the methods described above.

DETAILED DESCRIPTION

Figure 1:
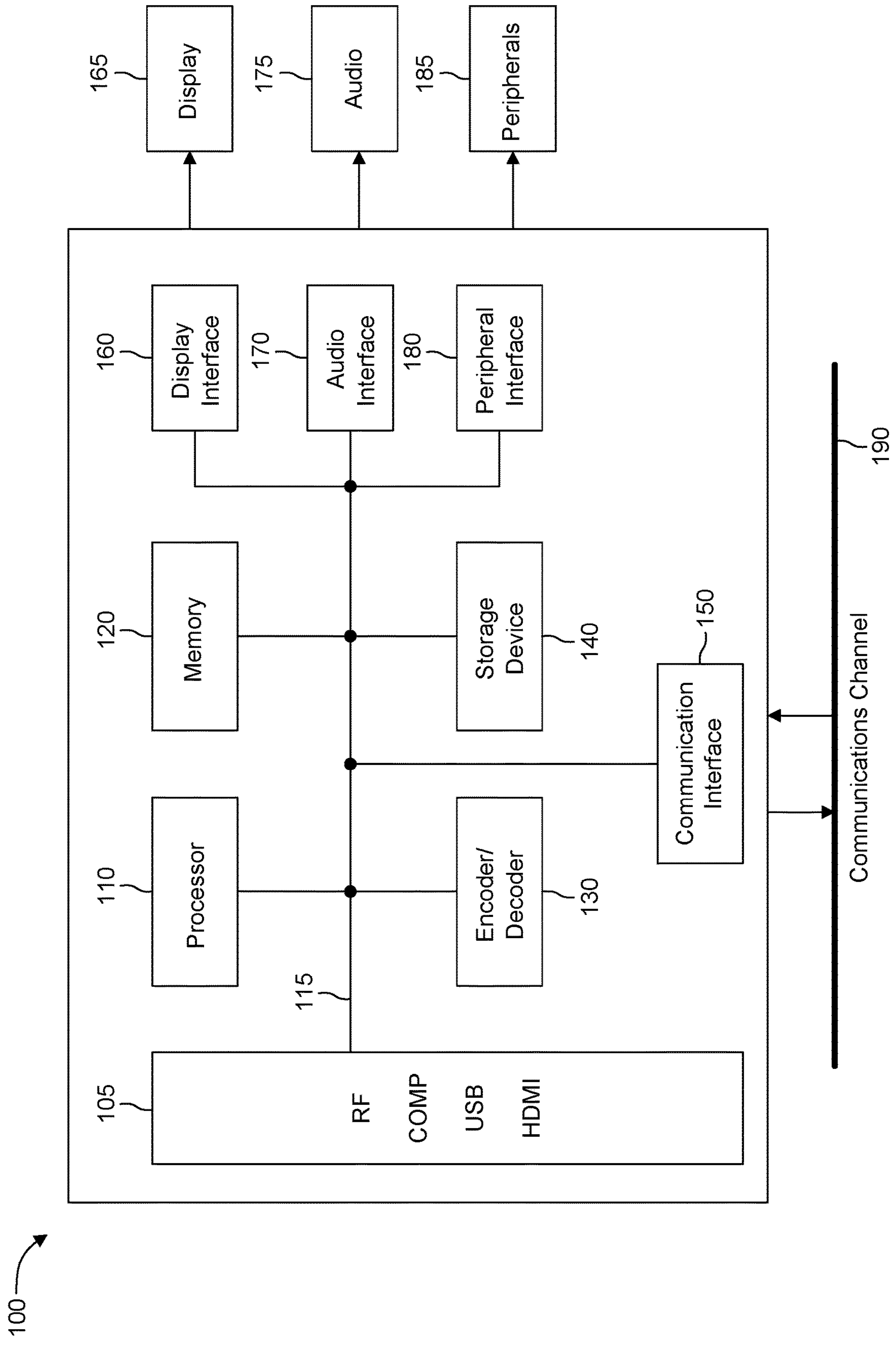
FIG. 1 illustrates a block diagram of a system within which aspects of the present embodiments may be implemented.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV. Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

It is contemplated that point cloud data may consume a large portion of network traffic, e.g., among connected cars over 5G network, and immersive communications (VR/AR). Efficient representation formats are necessary for point cloud understanding and communication. In particular, raw point cloud data need to be properly organized and processed for the purposes of world modeling and sensing. Compression on raw point clouds is essential when storage and transmission of the data are required in the related scenarios.

Furthermore, point clouds may represent a sequential scan of the same scene, which contains multiple moving objects. They are called dynamic point clouds as compared to static point clouds captured from a static scene or static objects. Dynamic point clouds are typically organized into frames, with different frames being captured at different times. Dynamic point clouds may require the processing and compression to be in real-time or with low delay.

The automotive industry and autonomous car are domains in which point clouds may be used. Autonomous cars should be able to "probe" their environment to make good driving decisions based on the reality of their immediate surroundings. Typical sensors like LiDARs produce (dynamic) point clouds that are used by the perception engine. These point clouds are not intended to be viewed by human eyes and they are typically sparse, not necessarily colored, and dynamic with a high frequency of capture. They may have other attributes like the reflectance ratio provided by the LiDAR as this attribute is indicative of the material of the sensed object and may help in making a decision.

Virtual Reality (VR) and immersive worlds are foreseen by many as the future of 2D flat video. For VR and immersive worlds, a viewer is immersed in an environment all around the viewer, as opposed to standard TV where the viewer can only look at the virtual world in front of the viewer. There are several gradations in the immersivity depending on the freedom of the viewer in the environment. Point cloud is a good format candidate to distribute VR worlds. The point cloud for use in VR may be static or dynamic and are typically of average size, for example, no more than millions of points at a time.

Point clouds may also be used for various purposes such as culture heritage/buildings in which objects like statues or buildings are scanned in 3D in order to share the spatial configuration of the object without sending or visiting the object. Also, point clouds may also be used to ensure preservation of the knowledge of the object in case the object may be destroyed, for instance, a temple by an earthquake. Such point clouds are typically static, colored, and huge.

Another use case is in topography and cartography in which using 3D representations, maps are not limited to the plane and may include the relief Google Maps is a good example of 3D maps but uses meshes instead of point clouds. Nevertheless, point clouds may be a suitable data format for 3D maps and such point clouds are typically static, colored, and huge.

World modeling and sensing via point clouds could be a useful technology to allow machines to gain knowledge about the 3D world around them for the applications discussed herein.

3D point cloud data are essentially discrete samples on the surfaces of objects or scenes. To fully represent the real world with point samples, in practice it requires a huge number of points. For instance, a typical VR immersive scene contains millions of points, while point clouds typically contain hundreds of millions of points. Therefore, the processing of such large-scale point clouds is computationally expensive, especially for consumer devices, e.g., smartphone, tablet, and automotive navigation system, that have limited computational power.

In order to perform processing or inference on a point cloud, efficient storage methodologies are needed. To store and process an input point cloud with affordable computational cost, one solution is to down-sample the point cloud first, where the down-sampled point cloud summarizes the geometry of the input point cloud while having much fewer points. The down-sampled point cloud is then fed to the subsequent machine task for further consumption. However, further reduction in storage space can be achieved by converting the raw point cloud data (original or down-sampled) into a bitstream through entropy coding techniques for lossless compression. Better entropy models result in a smaller bitstream and hence more efficient compression. Additionally, the entropy models can also be paired with downstream tasks which allow the entropy encoder to maintain the task-specific information while compressing.

In addition to lossless coding, many scenarios seek lossy coding for significantly improved compression ratio while maintaining the induced distortion under certain quality levels.

Point cloud compression (PCC) refers to the problem of succinctly representing the surface manifold of the object(s) contained within a point cloud. Several fronts in regards to point cloud compression have been explored and can broadly be categorized into the following categories: PCC in the input domain, PCC in the primitive domain, PCC in the transform domain, and finally PCC via entropy coding. PCC in the input domain refers to down-sampling the raw point cloud by choosing or generating novel key points that are representative of the underlying surface manifold. Although several learned (deep learning-based) and classical machine learning techniques exist in this area, many PCCs in the input domain are only suitable for dense point clouds as the network is restricted to do regular convolution. For PCC in the primitive domain, key points primitives (regular geometric 2D/3D shapes) are generated that aim to closely follow the underlying object manifold. PCC in the transform domain refers to the case when the raw point cloud data is first transformed into another domain via classical methods and then the transformed representation in the new domain is compressed to obtain more efficient compression. Though some work can be interpreted as transformation, it is non-trivial to have them been applied for a compression system. Finally, in the case of PCC via entropy coding, either the raw point cloud data or another (trivially obtained) representation of the point cloud is entropy coded via either adaptive learning-based or classical methods.

Generally, the raw point cloud data obtained from sensing modalities contains huge number of unorganized points that need to be stored efficiently. However, the irregularities and sparsity of point cloud data make it difficult for compression.

The present application relates to transform-based PCC, since we propose to organize an irregular point cloud as a 2D image which can then be compressed with popular transform-based approaches such as JPEG, MPEG AVC/HEVC/VVC. In one embodiment, based on a neural network, we unfold an input point cloud onto a regular, organized grid structure to achieve efficient coding of the point cloud data.

FoldingNet

FoldingNet is an autoencoder developed in the context of high-level computer vision problems, e.g., classification/segmentation, via unsupervised learning.

Figure 2:
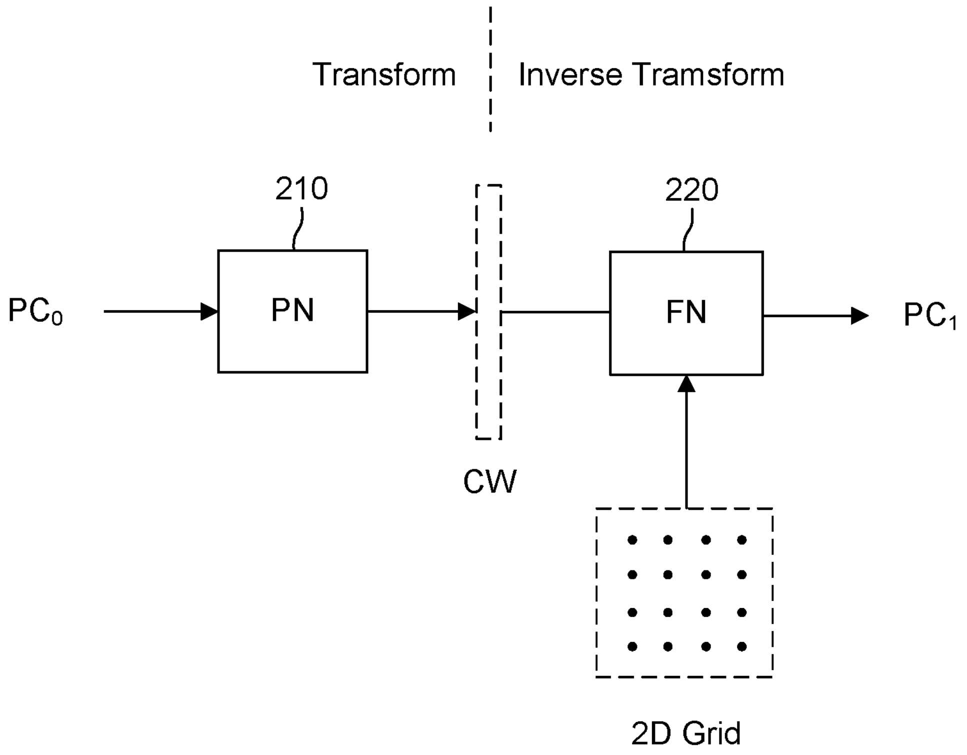
FIG. 2 illustrates a block diagram of the FoldingNet.

FIG. 2 shows a simplified diagram of FoldingNet to highlight the transform (encoder) and the inverse transform (decoder). Note that we intentionally renamed the encoder/decoder in the autoencoder as "transform"/"inverse transform" to align the terms to the context of compression.

A 2D grid structure, which is an image based on a pre-defined sampling pattern on a 2D surface, is introduced into the inverse transform (decoder) of FoldingNet. In one embodiment, it is a two-channel image representing 2D coordinates regularly sampled in a square region. In another embodiment, it consists of coordinates regularly sampled on a 2D sphere.

Given an original point cloud PCo (M points), the transforming module PN (210) generates a codeword CW in a latent space. Here, a latent space refers to an abstract multi-dimensional feature space, and the codeword CW is a feature vector representing the point cloud. Typically, the codeword can provide a high-level description or a rough representation of the point cloud.

Then the module FN (220) performs an inverse transforming process. It takes the 2D grid as an input in addition to the codeword CW, and endeavors to reconstruct another point cloud $PC_1$ which is close to the input $PC_0$. The 2D grid contains N=W×H grid points, where W and H are the width and height of the grid image. In FIG. 2, the 2D grid image has a square shape. More generally, the 2D grid can take other shapes, such as a 2D sphere or 2D rectangle. The grid points can also be 3D grid points rather than 2D grid points in a 2D image. The FN module (220) specifically maps each point on the 2D grid to one 3D point in the reconstructed point cloud. The point cloud output from the FN module, $PC_1$, contains N points, where N is not necessarily equal to M. Intuitively, the FN module "folds" a pre-defined 2D region to the reconstruction. By embedding/utilizing a 2D grid structure, FoldingNet is able to reconstruct various point clouds via an end-to-end training.

Proposed UnfoldingOperator for Point Clouds

The design of FoldingNet promotes the high-level representability of codeword CW. With CW alone, it is intractable to reconstruct fine details in a point cloud, i.e., hard to reconstruct each individual point accurately. Hence, compressing the codeword CW alone from FoldingNet will not solve the point cloud compression problem where pointwise distortion also matters in addition to high-level representability.

To address this challenge, the UnfoldingOperator is proposed. The UnfoldingOperator directly embeds (or unfolds) a raw input point cloud onto a regular image. Compared to the codeword CW, the image representation from the UnfoldingOperator contains detailed information of the point cloud. Moreover, since the image data format is dense and organized, it is more suitable for down-stream processing, such as point cloud compression.

Figure 3:
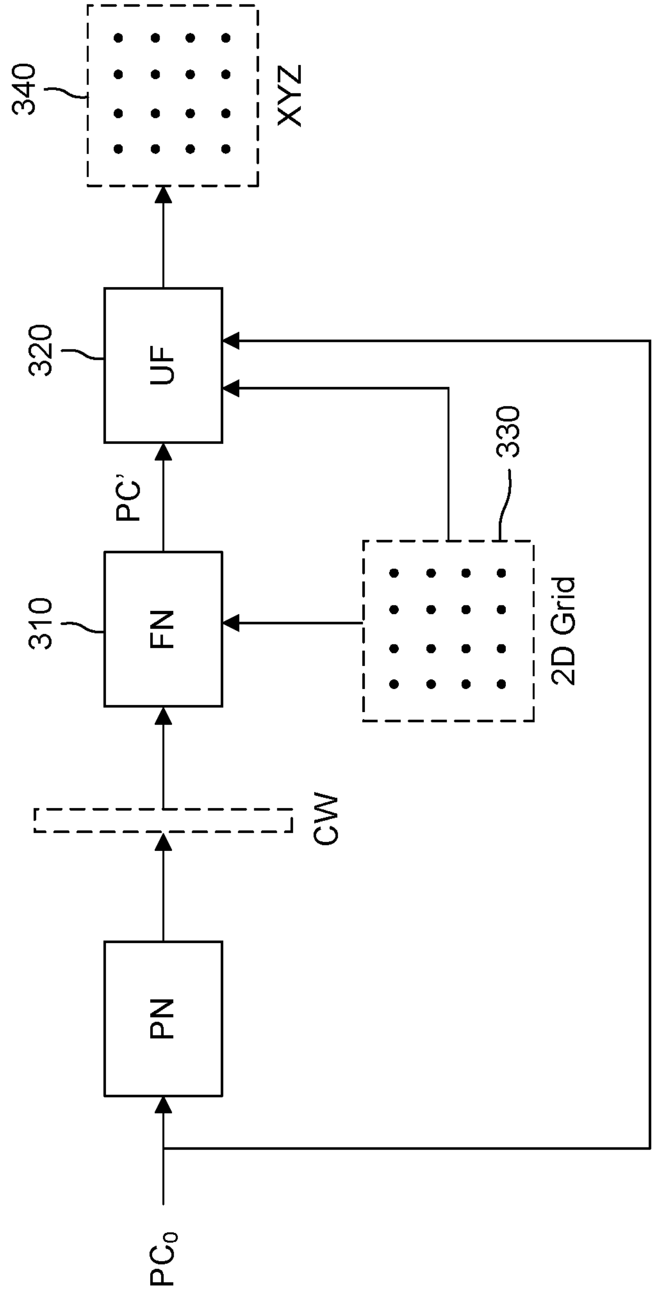
FIG. 3 illustrates a block diagram of the UnfoldingOperator, according to an embodiment.

In one embodiment, to unfold the input point cloud, it is proposed to utilize the FN module to facilitate a newly proposed UF module as shown in FIG. 3. In particular, the reconstruction PC' by the FN module (310) is used to establish a mapping to the input $PC_0$, then the UF module (320) unfolds the input $PC_0$ onto the 2D grid (330) based on the identified mapping. With each point in the UF output, XYZ (340), it now represents the position of a point from the original input, $PC_0$. It is essentially an organized version of $PC_0$. Note that the point number of XYZ may not be the same as the point number of $PC_0$.

Specifically, the UF module (320) takes $PC_0$, the reconstruction PC' and its corresponding 2D grid as inputs. It first matches each point in PC' to a point in $PC_0$. Suppose point P' from PC' is matched with point $P_0$ from $PC_0$, then the 3D coordinate of $P_0$ is put onto the 2D-grid position associated with P' (i.e., the 2D grid position that is mapped to point P' in the reconstructed point cloud PC'). In this way, a 3-channel image on the 2D grid, XYZ, is constructed as the unfolding output. In a more general use case, not only the 3D coordinates but also other point attributes, such as color, normal, reflectance, etc., are put onto the 2D-grid. In that case, a K-channel image on the 2D grid (still denoted as XYZ without loss of generality) can be constructed as the unfolding output. Generally, the unfolding output can be seen as a data array with samples on the 2D grid, each sample includes K components indicating point attributes, for example, 3D position, color, normal, and/or reflectance.

Note that the FN module guides the mapping between $PC_0$ and PC' through its output PC'. It helps the XYZ image to preserve smoothness, i.e., two neighboring points in $PC_0$ are likely to be neighbors in the XYZ image.

The unfolded XYZ image is not only useful for the compression tasks, but also makes it possible to bring neural network based approaches from image domain to point cloud domain, because a non-organized point cloud is able to be represented in a three-channel image format. In particular, many neural network based methods in image domain rely on the pixel arranging format, that cannot be directly applied for point cloud tasks. However, by virtue of the proposed UF module, the generated XYZ image can be directly fed into neural networks that process regular images, e.g., convolutional neural networks (CNNs).

Figure 4:
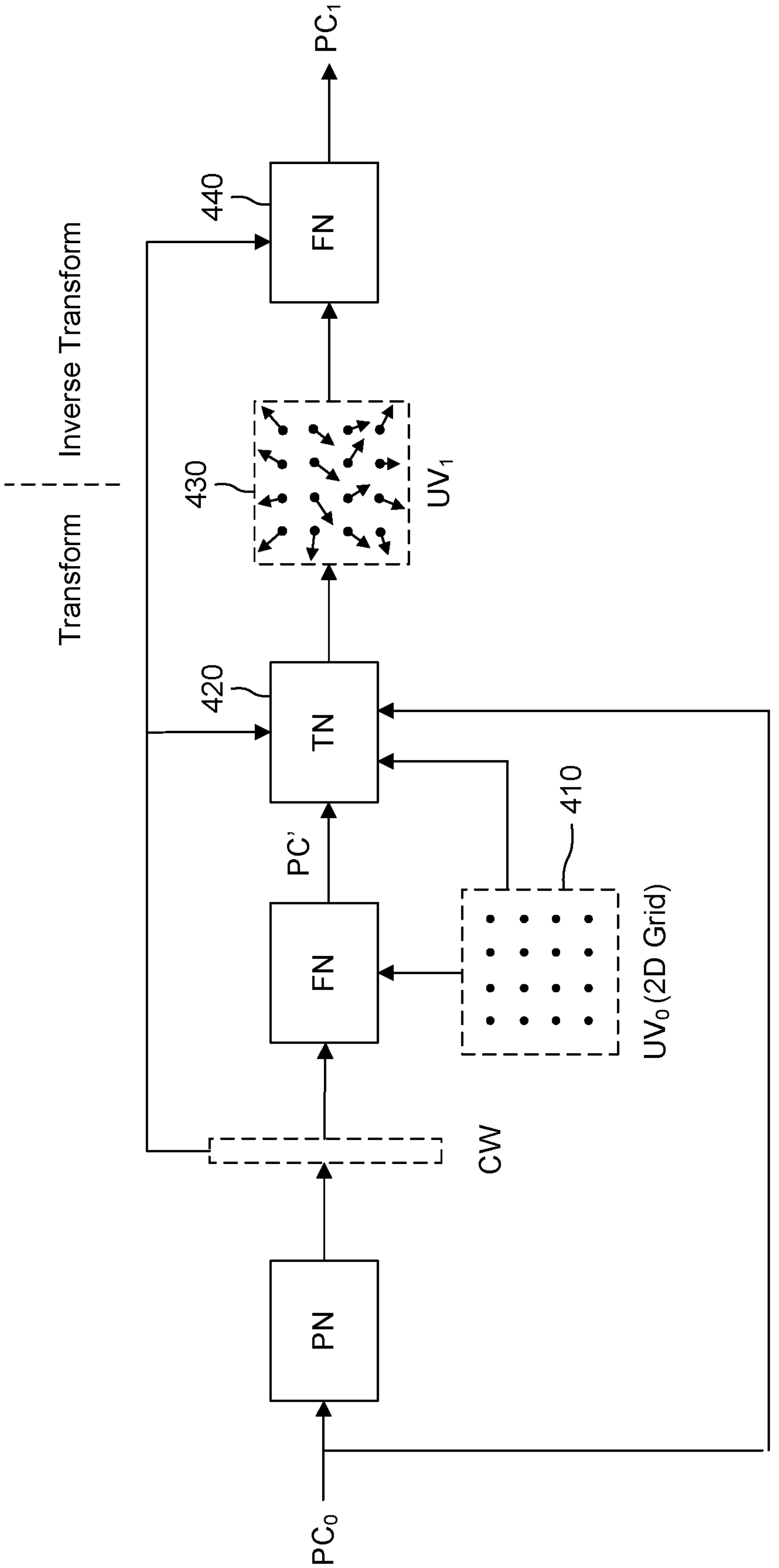
FIG. 4 illustrates a block diagram of the TearingTransform.

The proposed UnfoldingOperator is related to the TearingTransform (and TearingCompression) as described in a commonly owned U.S. Provisional Application No. 63/181,270, entitled "Learning-Based Point Cloud Compression Via Tearing Transform". TearingTransform (and TearingCompression) also aims to reconstruct an input point cloud with fine details. A diagram of the TearingTransform is shown in FIG. 4. Instead of directly putting the XYZ coordinates onto the 2D-grid, TearingTransform (or TearingCompression) estimates an $UV_1$ image (430) with a neural network module TN (420). This image modifies the original point positions on the 2D grid ($UV_0$, 410). It aims at compensating the errors in the 3D reconstruction by another iteration of the FN module (440) with $UV_1$ as input. However, when the input point cloud is too complex for the TN module to output a high-quality $UV_1$ image, the TearingTransform fails to provide faithful reconstructions. In such cases, it is proposed to switch to the UnfoldingOperator instead of running the TN module, so as to directly put the 3D points in the 2D grid, and to guarantee high-quality point cloud reconstruction.

The UV image in TearingNet is introduced and updated within the inverse transformer (decoder). The UV image is defined based on a 2D sampling grid at certain resolution. In one embodiment, the two channels in the UV image represents coordinates in the 2D space. In another embodiment, they represent the coordinate offsets with respect to their default positions in the 2D space.

Network Architecture for the Proposed PN in the UnfoldingOperator

Figure 5:
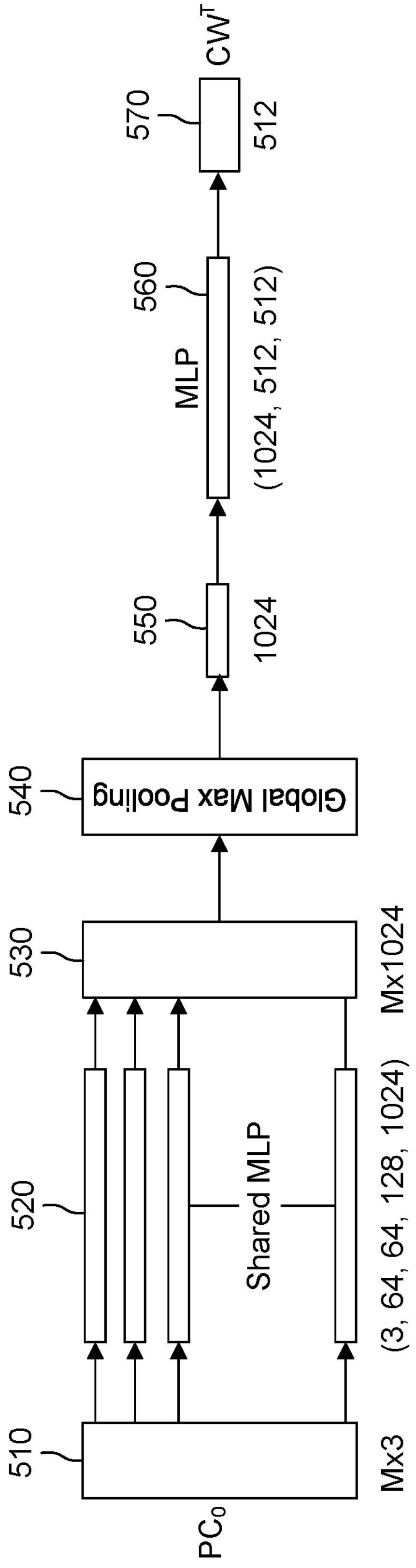
FIG. 5 illustrates an example of network architecture design for the PN module, according to an embodiment.

FIG. 5 illustrates an example of the detailed architecture of the PN module, which takes the input point cloud $PC_0$ (510) as input and outputs the (transpose of the) codeword CW (570) in the latent space. In particular, the input point cloud $PC_0$ contains M points, and each point P is represented by its 3D position ($x_p$, $y_p$, $z_p$). Additional attributes, such as color or normal, may be also included in the point cloud data. The PN module is composed of a set of shared MLPs (Multi-layer Perceptrons, 520). The perceptron is applied independently and in parallel on each 3D point (numbers in brackets indicate layer sizes). The output of the set of shared MLPs, point features (530, Mx1024), are aggregated by the global max pooling operation (540), which extracts a global feature with a length 1024 (550). It is further processed with another set of MLP layers (560), leading to the output codeword CW with a length 512 (570).

Network Architecture for the Proposed FN in the UnfoldingOperator

Figure 6:
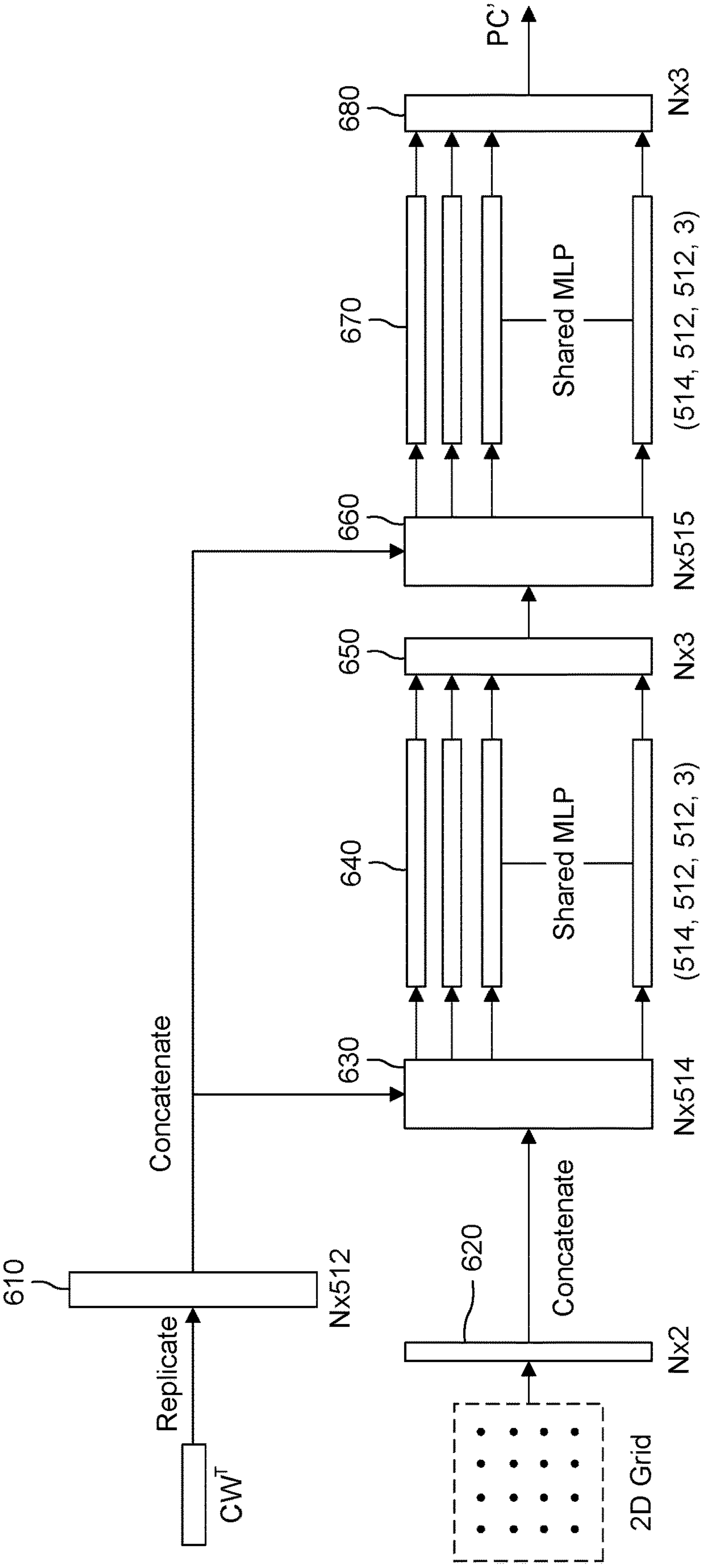
FIG. 6 illustrates an example of network architecture design for the FN module, according to an embodiment.

FIG. 6 illustrates an example of the detailed design of the FN module, which takes the codeword CW and the 2D grid as input and outputs a reconstructed 3D point cloud PC'. Here, the FN module is composed of two series of shared MLP layers (640, 670). The FN module can be seen as a 2D-to-3D mapping guided by the codeword, where the N grid points in the 2D grid image are mapped to the M points on the surface of the reconstructed point cloud. For each reconstructed point in PC' mapped from the N grid point, a 3D point from the input point cloud $PC_0$ is identified, e.g., based on a nearest neighbor searching.

The codeword is replicated N times and the resulting Nx512 matrix (610) is concatenated with an Nx2 matrix (620) that contains the N grid points in the 2D grid. The result of the concatenation is a matrix of size Nx514 (630), which is fed to the first series of shared MLP layers (640) to output a matrix of size Nx3 (650). Then the replicated codewords are concatenated to the Nx3 output (650) to form a matrix of size Nx515 (660), which is fed into the second series of shared MLP layers (670). The final output PC' (680) is the reconstructed point cloud represented by Nx3 matrix, where N is the number of points in the output point cloud PC'.

Proposed UF Module in the UnfoldingOperator

Figure 7:
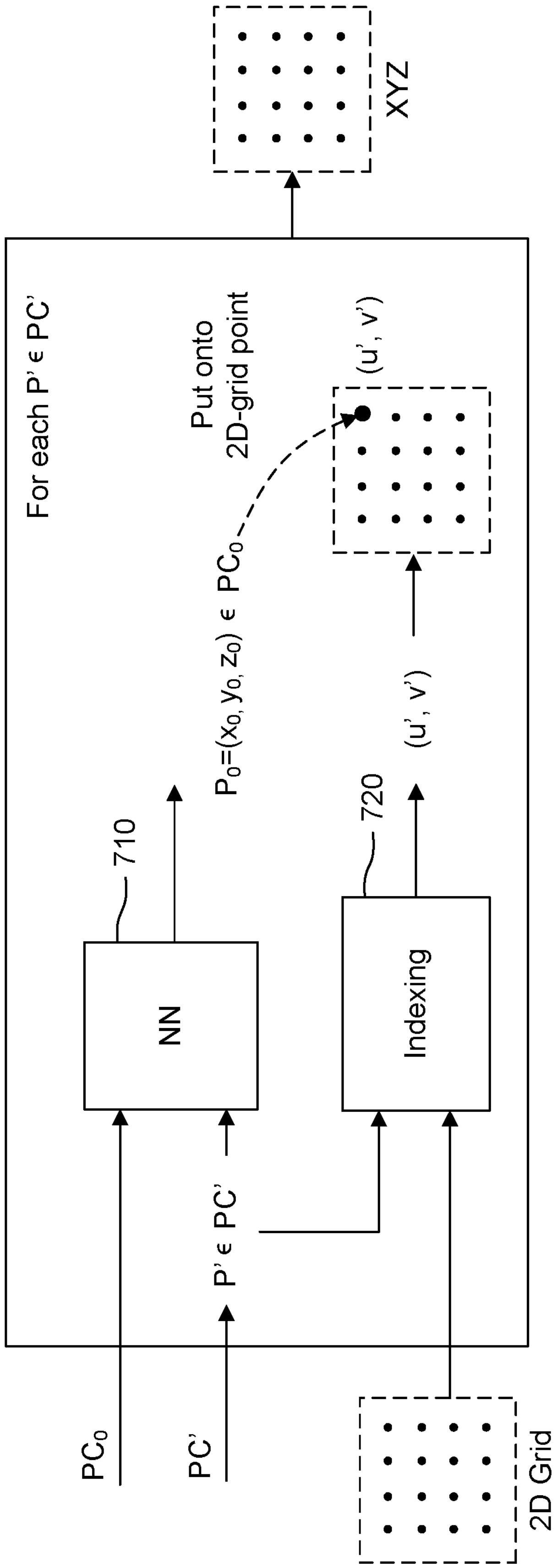
FIG. 7 illustrates a proposed diagram for the UF module, according to an embodiment.

FIG. 7 shows the block diagram of the UF module, according to an embodiment. Note that it is a deterministic module, without any learnable neural network parameters.

For each point P' in PC', a corresponding point $P_0$ is first identified, for example, via nearest neighbor search, using the NN module (710). We note that point P' corresponds to a 2D point (u', v') in the 2D grid as described before for the FN module. In other words, the 2D position (u', v') can be indexed/retrieved via P'. Then the UF module puts the coordinate of $P_0=(x_0, y_0, z_0)$ onto the 2D-grid position (u', v') associated with P', i.e., XYZ (u', v', 1)=$x_0$, XYZ (u', v', 2)=$y_0$, and XYZ (u', v', 3)=$z_0$. Performing this operation for each point in PC' leads to the UF output, XYZ, which is a 3-channel image.

In one embodiment, except for the 3D coordinates $P_0=(x_0, y_0, z_0)$, other features associated with the 3D point $P_0$, for example, but not limited to, color (RGB), normal vector, and reflectance, are also put onto the 2D-grid position (u', v') to form the XYZ image. For example, XYZ (u', v', 4)=R, XYZ (u', v', 5)=G, XYZ (u', v', 6)=B, XYZ (u', v', 7)=$n_x$, XYZ (u', v', 8)=$n_y$, XYZ (u', v, 9)=$n_z$, and XYZ (u', v', 10)=r, where (R, G, B) is the color at $P_0$, ($n_x$, $n_y$, $n_z$) is the normal vector at $P_0$ and r is the reflectance at $P_0$. In this embodiment, the XYZ image contains the 3D coordinates as well as other point features, namely, the XYZ image is a K-channel image where K>3.

In the above, the examples of the PN, FN, and UF modules are described. It should be noted that these modules can use different network structures or configurations. For example, the MLP dimensions may be adjusted according to the complexity of practical scenarios, or more sets of MLPs can be used. Generally, any network structure that meets the input/output requirements can be used.

Differential UnfoldingOperator

Figure 8:
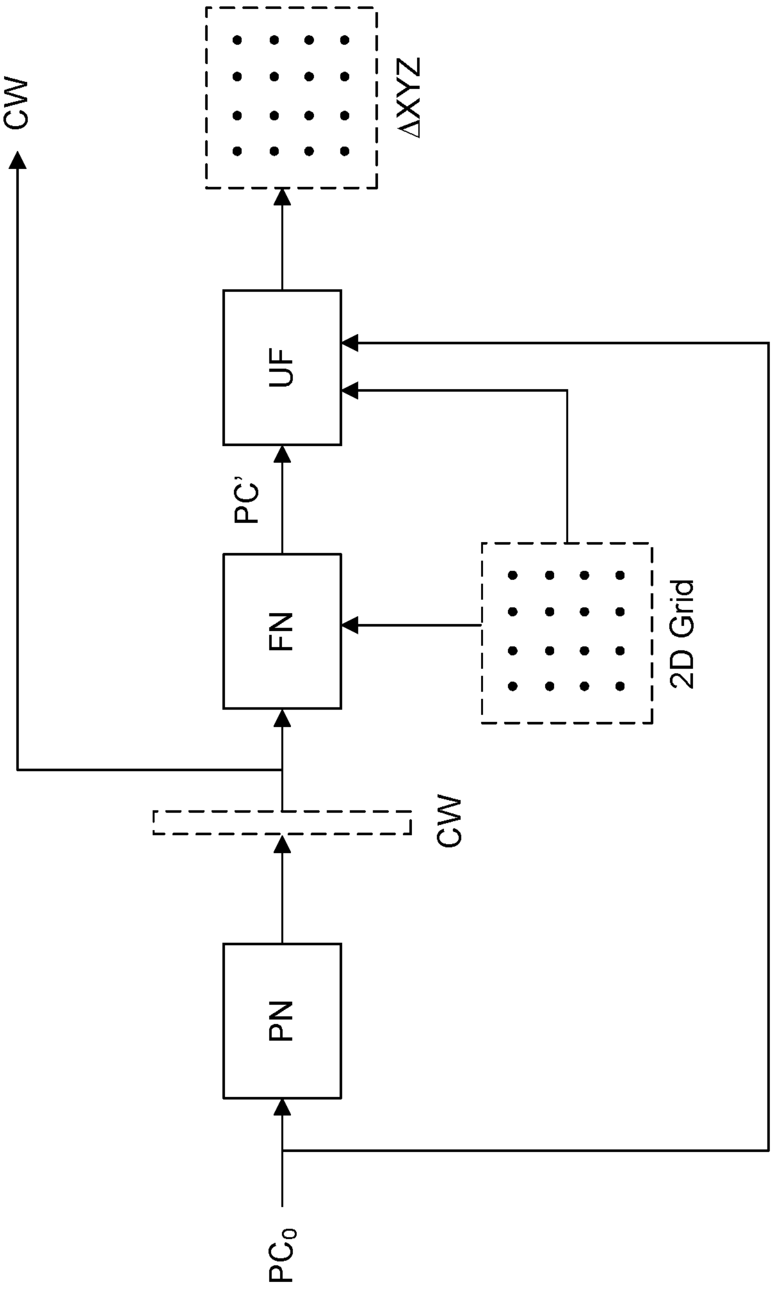
FIG. 8 illustrates a block diagram for the differential UnfoldingOperator, according to an embodiment.

In the previous embodiment, the XYZ image serves as the only representation of $PC_0$. In this embodiment, an input point cloud is decomposed into codeword CW and another 3-channel image, denoted as ΔXYZ. The codeword CW is used to reconstruct a rough shape of the point cloud, while ΔXYZ is to represent fine details on top of the rough reconstruction. FIG. 8 shows the block diagram of this embodiment which we called differential UnfoldingOperator. It is similar to an encoding/transformation process.

In the differential UnfoldingOperator, the UF module computes the residual between $PC_0$ and PC' then put the residual on the image ΔXYZ. Therefore, CW and ΔXYZ together represent $PC_0$, and ΔXYZ is used to compensate the error.

Figure 9:
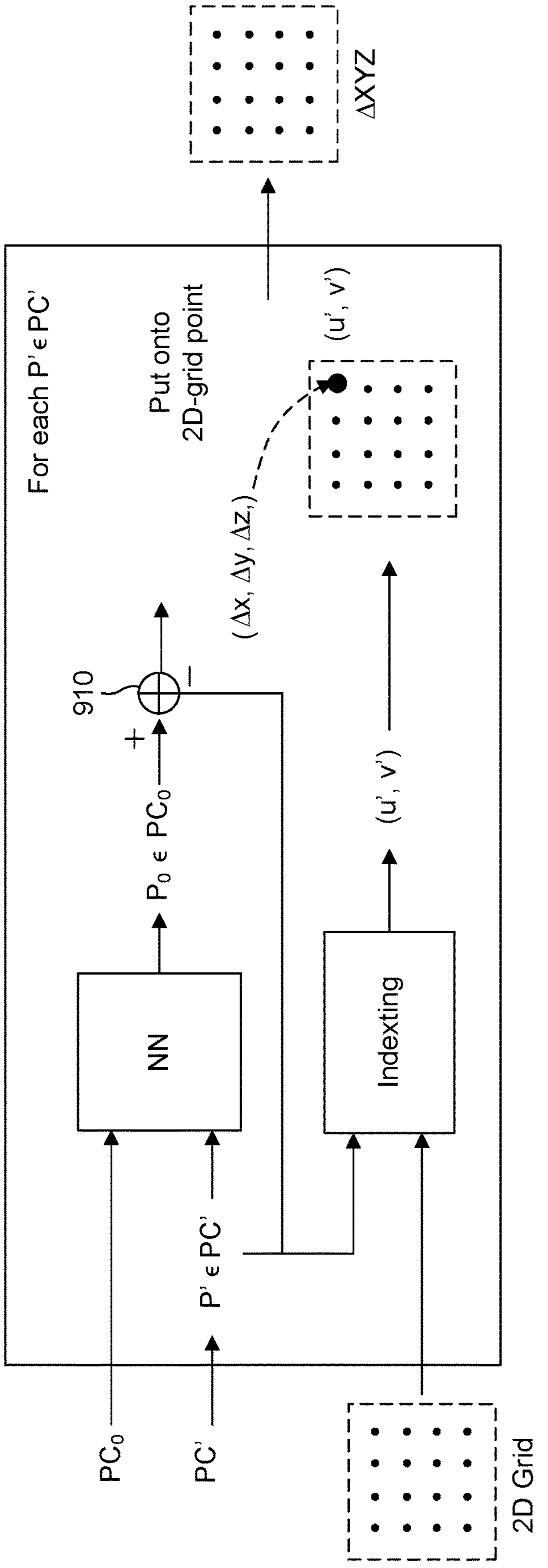
FIG. 9 illustrates a block diagram of the UF module in differential UnfoldingOperator, according to an embodiment.

FIG. 9 shows the design of the UF module in differential UnfoldingOperator, according to an embodiment. Different from the previous embodiment, here the UF module computes (910) the difference between the matched point $P_0=(x_0, y_0, z_0)$ (from $PC_0$) and the query point P'=(x', y', z') (from PC'), denoted as $(\Delta x, \Delta y, \Delta z)=(x_0-x', y_0-y', z_0-z')$. This residual/difference vector is put onto the 2D-grid position (u', v') associated with P', i.e., ΔXYZ (u', v', 1)=Δx, ΔXYZ (u', v', 2)=Δy, and ΔXYZ (u', v', 3)=Δz. In this way, a 3-channel residual map on the 2D grid, ΔXYZ, is constructed as the output of the UF module.

Similar to the XYZ image representation, the ΔXYZ can also include more information. Generally, the differential unfolding output can be seen as a data array with samples on the 2D grid, each sample includes K components where the first three components contain Δx, Δy and Δz (the residual of the 3D positions), and the rest components include other attributes, for example, the RGB color, the normal vector and the reflectance.

Figure 10:
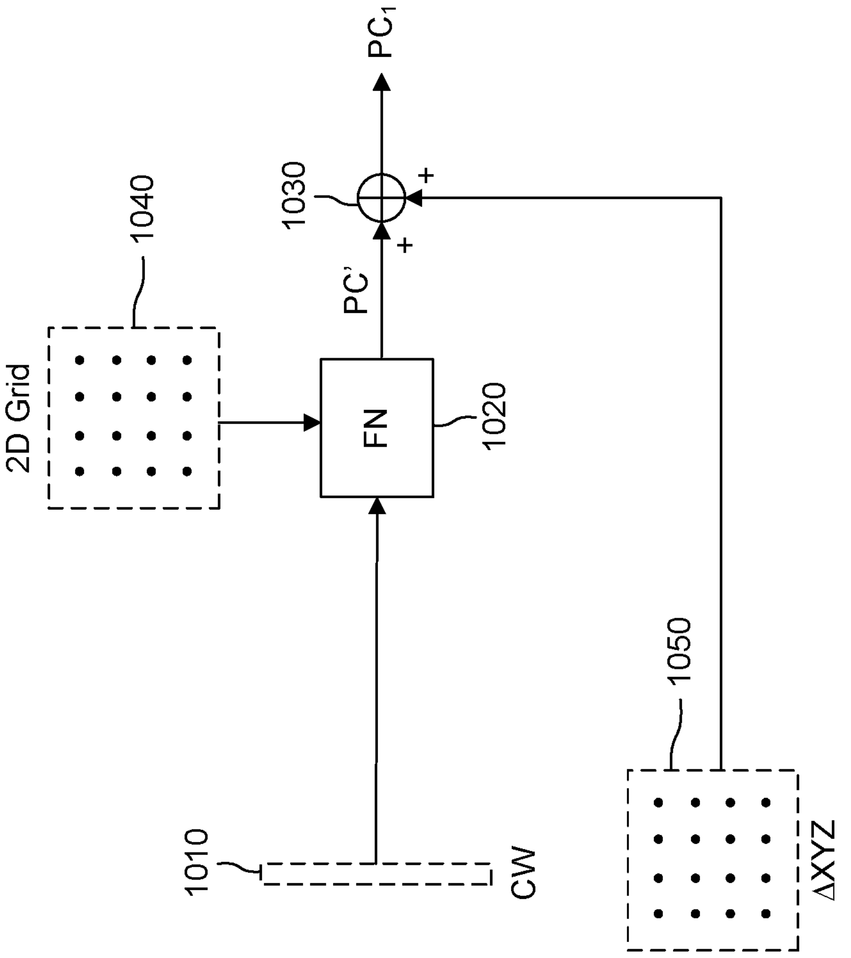
FIG. 10 illustrates a block diagram of point cloud reconstruction for the differential UnfoldingOperator, according to an embodiment.

FIG. 10 shows the process to reconstruct (decode or inverse transform) the point cloud from CW and ΔXYZ, according to an embodiment. First, the FN module (1020) takes a codeword CW (1010) and 2D grid (1040) as inputs and reconstruct a rough shape PC'. Then by adding (1030) the residual map ΔXYZ (1050) to PC', the reconstruction $PC_1$ is obtained. Note that this step adds together each point in PC' and the corresponding residual vector in the ΔXYZ image.

Proposed Compression Framework: UnfoldingCompression

Figure 11:
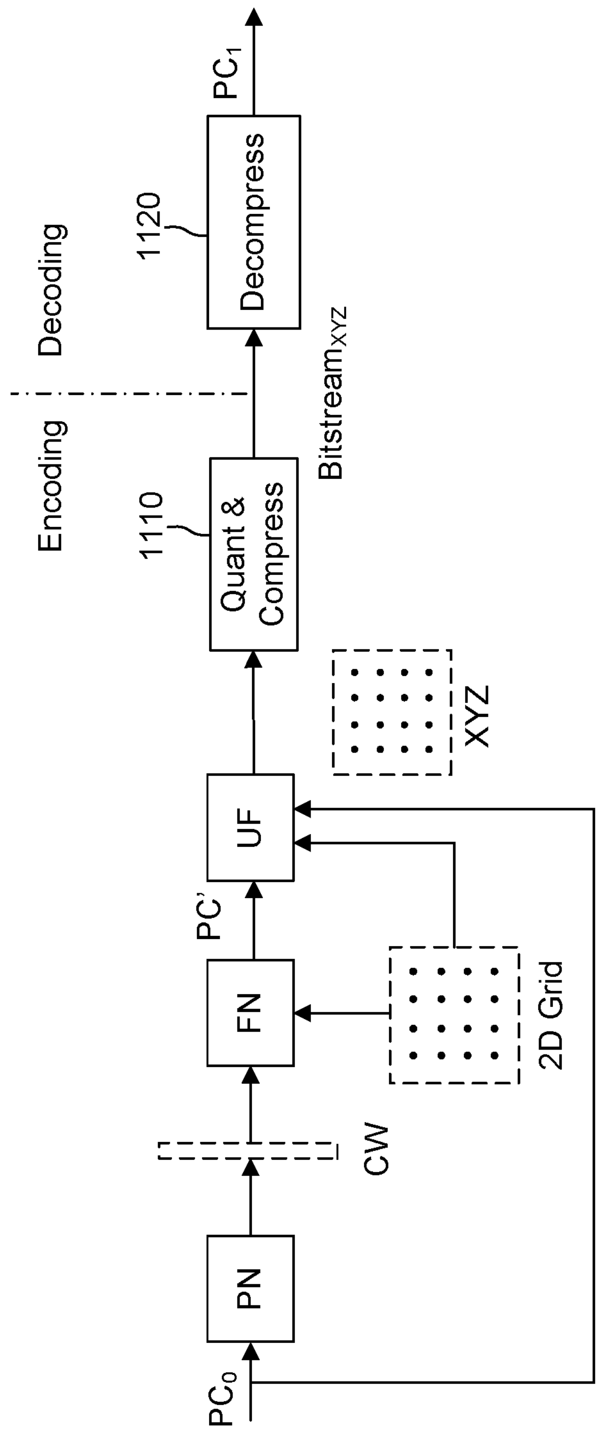
FIG. 11 illustrates a block diagram of the proposed UnfoldingCompression, according to an embodiment.

In this embodiment, it is proposed to apply the UnfoldingOperator in a learning-based point cloud compression system. The overall diagram of the proposed UnfoldingCompression is shown in FIG. 11. Comparing to the UnfoldingOperator that has a single output XYZ, UnfoldingCompression in addition compresses (1110) the XYZ image into a bitstream.

In one embodiment, the compression of the XYZ image can be based on state-of-the-art image/video compression methods, e.g., JPEG, MPEG AVC/HEVC/VVC. As described before, the information indicative of point positions ({X, Y, Z} or {ΔX, ΔY, ΔZ}) may be arranged into a 3-channel image with each position-indicative parameter carried on one of the three channels. Quantization (1110) is performed before compression, for example, in order to convert the floating numbers in the XYZ image to a data format used by the 2D video encoder. Also, without any adjustments, both the XYZ image and the ΔXYZ image may have negative values, we can normalize them and make their dynamic range fall into a pre-defined interval before sending them to the codec. In one embodiment, we first compute the minimum and the maximum values of each channel of the XYZ (or ΔXYZ) image, denoted by mink and maxk where k ranges from 1 to K. Then we normalize each channel of the XYZ image to the range, for example, [0, 255], before feeding it to the codec. In this case, the minimum and the maximum values mink and maxk of each channel need to be sent as metadata to facilitate the decoding. Note that the minimum and the maximum values may be floating point numbers and can take negative values.

In another embodiment, the compression can be neural network-based methods, such as a variational autoencoder based on a factorized prior model or a scale hyperprior model, which approximates the quantization operation by adding uniform noise. It generates a differentiable bitrate $R_{XYZ}$ for end-to-end training. Since the neighboring samples in the XYZ or ΔXYZ images usually represent neighboring points in the original point cloud, usually there is strong correlation between neighboring samples. Thus, we anticipate that the XYZ and the ΔXYZ images would be coded efficiently with (unmodified) standard image and video codecs.

On the decoder side, provided a bitstream of the XYZ image as input, the XYZ image is decoded (1120). The reconstruction $PC_1$ is simply the 3D points on the XYZ image. In another embodiment where metadata is also received, the reconstruction also relies on the received metadata. For example, when the minimum and the maximum values mink and maxk of each channel is received on the decoder side, they are used to have each channel of the reconstruction $PC_1$ scaled back to their original range of values.

Figure 12:
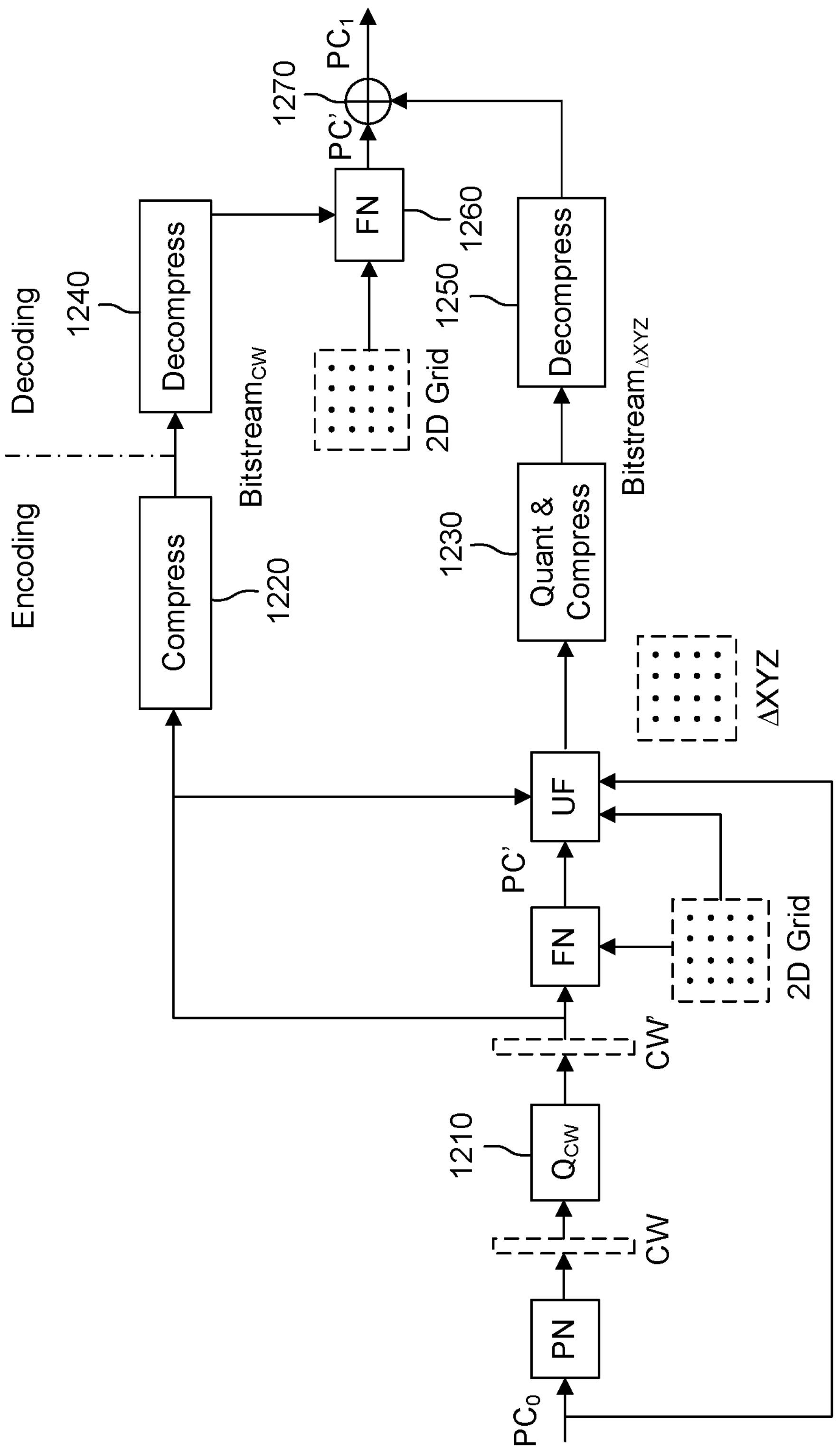
FIG. 12 illustrates a block diagram of the proposed differential UnfoldingCompression, according to an embodiment.

In another embodiment, the differential UnfoldingOperator is applied for PCC, as shown in FIG. 12, which we called differential UnfoldingCompression. In this embodiment, both the (quantized) latent code CW' and the 3-channel image ΔXYZ need to be encoded as bitstreams. Note that a quantization process ($Q_{CW}$, 1210) is applied on the codeword CW to obtain quantized coded word CW' before it is fed to the FN module during encoding. In one example, CW'=rounding (CW/QS), where QS is a selected quantization step. One of the motivations for the quantization is to have the input to the FN module be the same in both the encoding and the decoding stages.

In this embodiment, the compression (1230) of the ΔXYZ image can be similarly done as the XYZ image in UnfoldingCompression (FIG. 11). When neural network-based methods are applied, it generates a differentiable bitrate $R_{\Delta XYZ}$ for end-to-end training. The compression (1220) of codeword CW can also be a neural network-based module, such as a variational autoencoder based on a factorized prior model. It outputs a differentiable bitrate $R_{CW}$ for end-to-end training.

Provided bitstreams on the codeword CW' and ΔXYZ image as inputs, the decoder first reconstructs (1240, 1250) CW' and ΔXYZ from the coded symbols, then fed CW' to the FN module (1260), which takes input of both codeword CW and 2D grid to reconstruct a preliminary point cloud PC'. Then the residual ΔXYZ is added (1270) back to PC' to obtain the reconstruction $PC_1$. Note that the decoder uses decompression methods that correspond to the compression methods used to generate the codeword CW and grid.

In the example FIG. 12, there are separate bitstreams for the codeword and the ΔXYZ image. It should be noted that these bitstreams may be multiplexed into a single bitstream.

Working with TearingTransform or TearingCompression

In this embodiment, it is proposed to apply the UnfoldingOperator with the TearingTransform to form a point cloud reconstruction system. In general, the TearingTransform works well when the points of input point clouds exhibit a fairly regular distribution. However, if the input point clouds are too sparse for the TN module in the TearingTransform (FIG. 4), then the TearingTransform may fail to produce faithful point cloud reconstruction. For example, if the Chamfer distance between the preliminary reconstruction PC' and the original input $PC_0$ is larger than some pre-defined threshold, it implies that the raw input $PC_0$ is a difficult one, e.g., it is very noisy or it is from a novel domain that the neural network modules PN, FN and TN have not seen during training. In this case, we switch to UnfoldingTransform rather than using TearingTransform. In this case, instead of running the TN and the second FN in TearingTransform (FIG. 4), we switch to the UF module of the UnfoldingOperator (FIG. 3), which directly puts the original 3D points in the 2D grid and guarantees accurate reconstructions.

With the same rationale, it is proposed to apply the UnfoldingCompression with the TearingCompression to form a point cloud compression system. Specifically, when TearingCompression fails to produce high-quality decoded point cloud due to the failure of the TN module, the system switches to the proposed UF module to guarantee accurate reconstructions.

Training Methods

Training Methods for UnfoldingOperator

The UnfoldingOperator in FIG. 3 can be trained in a self-supervised manner. In one embodiment, it consists two steps to obtain the UnfoldingOperator. In the first step, a FoldingNet consisting of the PN module and the FN module (FIG. 2) is trained. A loss function is defined based on an error metric between input point cloud $PC_0$ and output point cloud $PC_1$, e.g., Chamfer distance (CD), or earth mover's distance (EMD). In the second step, the pre-trained parameters of the PN and FN modules are loaded into the UnfoldingOperator. Since the UF module in the UnfoldingOperator is to unfold the input point cloud according to the FN output PC' and it does not contain any learnable parameters, the UnfoldingOperator does not require additional fine-tuning in this second step. For differential UnfoldingOperator, the training method is the same.

Training Methods for UnfoldingCompression

The training method of UnfoldingOperator could be extended as follows to train UnfoldingCompression in FIG. 11. Comparing to UnfoldingOperator, UnfoldingCompression has an extra head that outputs bitstream in addition to output the point cloud. Hence, we extend the two-stage strategy for UnfoldingCompression as follows.

In the first stage, a FoldingNet (PN and FN) is first trained in the same way described earlier. In the second stage, end-to-end training on UnfoldingCompression will be conducted. The PN and FN modules are initialized with the parameters learned from the first stage. Then a rate-distortion loss is used for training. Specifically, the reconstruction quality, measured by CD or EMD between $PC_0$ and $PC_1$, is regularized by the bitrate of the XYZ bitstream, as shown below:

$$\text{loss} = d_{PC_0,PC_1} + \lambda R_{XYZ}$$

where $d_{PC_0,PC_1}$ is the reconstruction metric, and $R_{XYZ}$ is the bitrate of the XYZ image, while $\lambda$ is the coefficient to trade-off the rate $R_{XYZ}$ and distortion metric $d_{PC_0,PC_1}$.

For differential UnfoldingCompression, an additional bitstream for the latent code CW is needed. Then the training loss becomes:

$$\text{loss} = d_{PC_0,PC_1} + \lambda R_{\Delta XYZ} + \mu R_{CW}$$

where $R_{CW}$ is the CW bitstream, and $\mu$ is an additional coefficient to balance its importance.

Coding for Machine

Often a compressed point cloud is not solely to be viewed by human eyes, but also for machine-oriented tasks, e.g., classification or segmentation. In such scenarios, our proposal is further extended for performing machine tasks.

Figure 13:
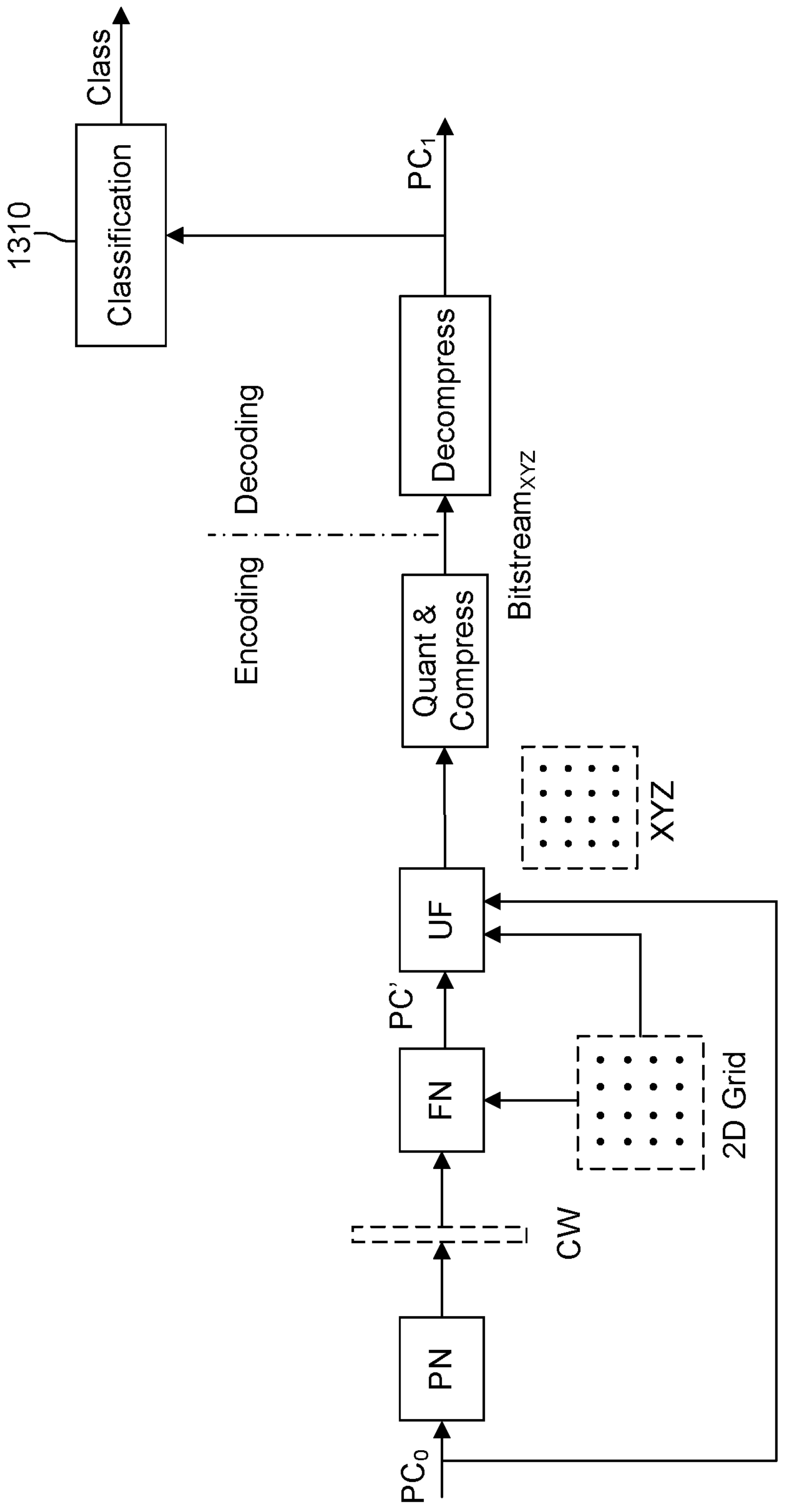
FIG. 13 illustrates a block diagram of the proposed UnfoldingCompression for machine, according to an embodiment.

The diagram of applying UnfoldingCompression for machine tasks is presented in FIG. 13. In this case, the decoded XYZ image, i.e., XYZ', serves as the representation of the decoded point cloud $PC_1$. Hence, the XYZ' image can be fed to a downstream task, like classification (1310). This additional head provides an extra supervision for a tradeoff between the performance of coding and classification.

Figure 14:
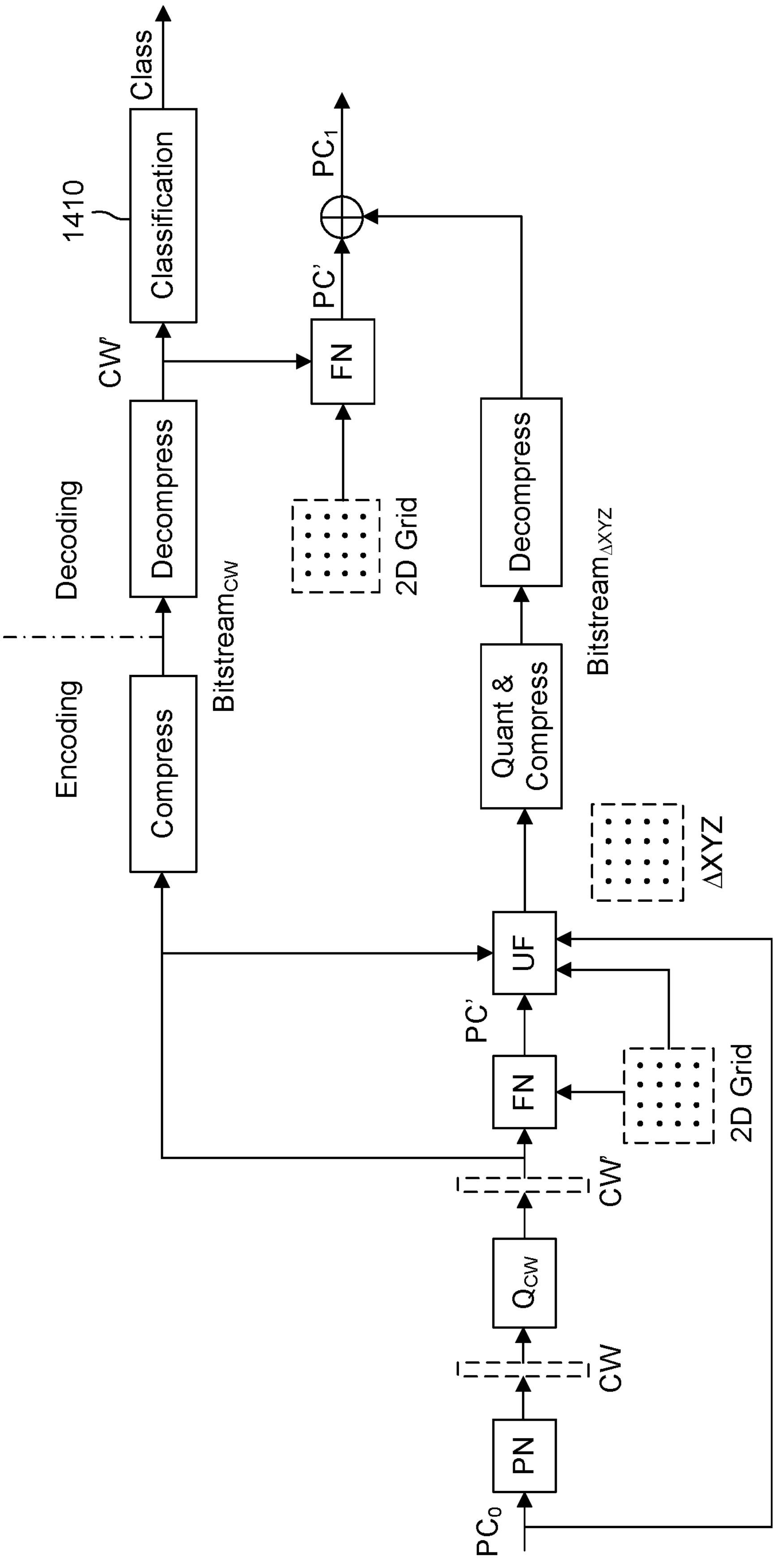
FIG. 14 illustrates a block diagram of the proposed differential UnfoldingCompression for machine, according to an embodiment.

The proposed differential UnfoldingCompression can also be extended for machine tasks, as shown in FIG. 14. In this scenario, the decoded latent code CW' serves the role as the high-level description of the point cloud in addition to reconstructing a preliminary point cloud. On the other hand, the ΔXYZ image is still concerned on the fine details in the point cloud. Such dual roles of the codeword CW allow a tradeoff between the need of human perception and machine tasks. For example, the codeword CW may be fed to a downstream task, like classification (1410) as shown in FIG. 14. Similarly, this additional head provides an extra supervision for a tradeoff between coding and classification.

Block-based PCC

In the above embodiments, the input point cloud to be encoded is a full point cloud frame. In another embodiment, it is proposed to first partition full point cloud frames into smaller point cloud blocks. Then the point cloud blocks are fed to the proposed UnfoldingOperator or UnfoldingCompression as inputs to limit the complexity required to process the input point clouds. In an embodiment, to compress the XYZ (or ΔXYZ) images of the small point cloud blocks with state-of-the-art image/video compression methods, e.g., JPEG, MPEG AVC/HiEVC/VVC, the XYZ (or ΔXYZ) images are tiled into a large image. The tiling can be based on the Morton order of the associated 3D block, or another pre-defined order. The tiling can also be arranged to make the induced large image more friendly to the downstream image/video codec, e.g., by minimizing the differences across neighboring image blocks. If a dynamic point cloud is fed to the system, then we get a sequence of tiled XYZ (or ΔXYZ) images which can be coded with existing video codecs.

Various numeric values are used in the present application. The specific values are for example purposes and the aspects described are not limited to these specific values.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for decoding point cloud data, comprising:

decoding a data array with samples on a regular grid, by a decoder associated with a neural network-based autoencoder, or an image or video decoder, wherein each sample in said data array includes a plurality of components indicating point attributes, wherein said point attributes include at least one of a position of a point in a point cloud, color, normal and reflectance; and reconstructing said point cloud responsive to said data array.

2. The method for claim 1, further comprising:

accessing a codeword that provides a representation of said point cloud, wherein said point cloud is reconstructed further responsive to said codeword.

3. The method of claim 2, wherein each sample in said data array indicates a difference between said position of a point in said point cloud and a position of a respective point in an initial version of said reconstructed point cloud.

4. The method of claim 2, further comprising:

generating an initial version of said reconstructed point cloud, based on said regular grid and said codeword, using a neural network-based module, wherein said initial version of said reconstructed point cloud is added to said data array to reconstruct said point cloud.

5. The method of claim 1, further comprising:

decoding at least an image or a video by said image or video decoder; and decoding data indicative of a range of positions of said point cloud data, wherein said decoded image or video is scaled responsive to said range of positions to reconstruct said point cloud.

6. A method for encoding point cloud data, comprising:

generating a codeword, by a first neural network-based module, which provides a representation of an input point cloud associated with said point cloud data;

reconstructing a first point cloud, by a second neural network-based module, based on said codeword and a grid;

generating a data array with samples on said grid, wherein each sample in said data array includes a plurality of components indicating point attributes, wherein said point attributes include at least one of a position of a point in said input point cloud, color, normal and reflectance, based on said reconstructed first point cloud, said grid, and said input point cloud; and compressing said data array by an encoder associated with a neural network-based autoencoder, or an image or video encoder.

7. The method of claim 6, further comprising:

identifying a corresponding point, for each point in said reconstructed first point cloud, from said input point cloud; and indexing, for each point in said reconstructed first point cloud, a corresponding position in said grid, wherein a sample associated with said corresponding position in said grid indicates a position of said corresponding point of said input point cloud.

8. The method of claim 7, wherein said sample associated with said corresponding position in said grid indicates a difference between said position of said corresponding point of said input point cloud and a position of said corresponding point of said reconstructed first point cloud.

9. The method of claim 6, wherein said second neural network-based module includes at least a first set of layers and a second set of layers, wherein said first set of layers is responsive to said codeword and said grid, and wherein said second set of layers is responsive to output of said first set of layers and said codeword.

10. The method of claim 9, wherein said first set of layers corresponds to a first set of shared MLPs and said second set of layers corresponds to a second set of shared MLPs.

11. An apparatus comprising at least one memory and one or more processors, wherein said one or more processors are configured to:

decode a data array with samples on a regular grid, by a decoder associated with a neural network-based autoencoder, or an image or video decoder, wherein each sample in said data array includes a plurality of components indicating point attributes, wherein said point attributes include at least one of a position of a point in a point cloud, color, normal and reflectance; and reconstruct said point cloud responsive to said data array.

12. The apparatus for claim 11, wherein said one or more processors are further configured to:

access a codeword that provides a representation of said point cloud, wherein said point cloud is reconstructed further responsive to said codeword.

13. The apparatus of claim 11, wherein each sample in said data array indicates a difference between a said position of a point in said point cloud and a position of a respective point in an initial version of said reconstructed point cloud.

14. The apparatus of claim 13, wherein said one or more processors are further configured to:

generate said initial version of said reconstructed point cloud, based on said regular grid and a codeword, using a neural network-based module, wherein said initial version of said reconstructed point cloud is added to said data array to reconstruct said point cloud.

15. The apparatus of claim 11, wherein said one or more processors are further configured to:

decode at least an image or a video by said image or video decoder; and decode data indicative of a range of positions of point cloud data, wherein said decoded image or video is scaled responsive to said range of positions to reconstruct said point cloud.

16. An apparatus for encoding point cloud data, comprising at least one memory and one or more processors, wherein said one or more processors are configured to:

generate a codeword, by a first neural network-based module, which provides a representation of an input point cloud associated with said point cloud data;

reconstruct a first point cloud, by a second neural network-based module, based on said codeword and a grid;

generate a data array with samples on said grid, wherein each sample in said data array includes a plurality of components indicating point attributes, wherein said point attributes include at least one of a position of a point in said input point cloud, color, normal and reflectance, based on said reconstructed first point cloud, said grid, and said input point cloud; and compressing said data array by an encoder associated with a neural network-based autoencoder, or an image or video encoder.

17. The apparatus of claim 16, wherein said one or more processors are further configured to:

identify a corresponding point, for each point in said reconstructed first point cloud, from said input point cloud; and index, for each point in said reconstructed first point cloud, a corresponding position in said grid, wherein a sample associated with said corresponding position in said grid indicates a position of said corresponding point of said input point cloud.

18. The apparatus of claim 17, wherein said sample associated with said corresponding position in said grid indicates a difference between said position of said corresponding point of said input point cloud and a position of said corresponding point of said reconstructed first point cloud.

19. The apparatus of claim 16, wherein said second neural network-based module includes at least a first set of layers and a second set of layers, wherein said first set of layers is responsive to said codeword and said grid, and wherein said second set of layers is responsive to output of said first set of layers and said codeword.

20. The apparatus of claim 19, wherein said first set of layers corresponds to a first set of shared MLPs and said second set of layers corresponds to a second set of shared MLPs.

* * * * *